E. A. WEIBEL.
HANDLE.
APPLICATION FILED APR. 8, 1921.
1,424,052. Patented July 25, 1922.
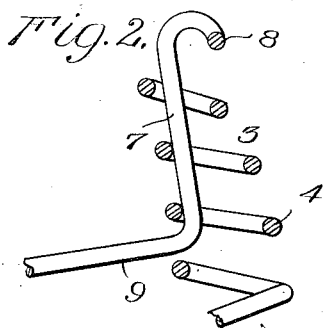
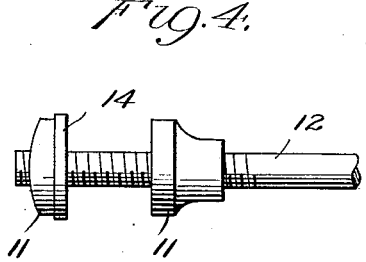
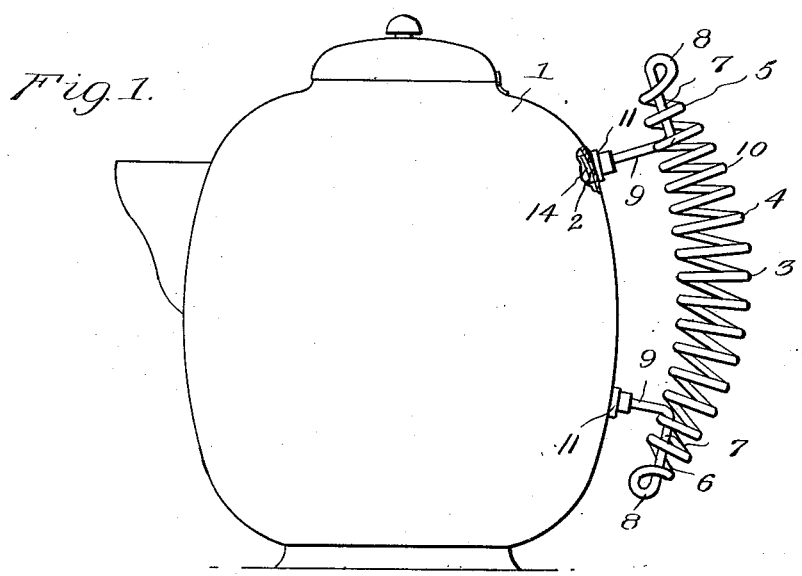
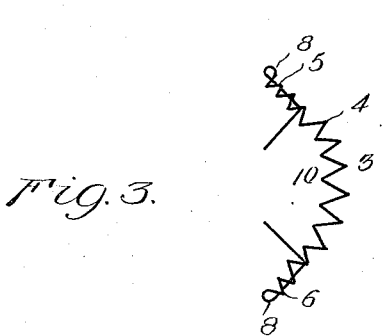
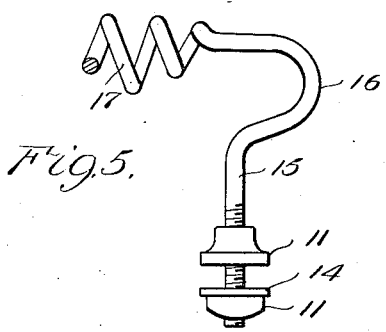
E. A. WEIBEL
INVENTOR
BY Victor J. Evans
ATTORNEY

UNITED STATES PATENT OFFICE.

EMIL A. WEIBEL, OF FAIRBANK, IOWA.

HANDLE.

1,424,052.  Specification of Letters Patent.  Patented July 25, 1922.

Application filed April 8, 1921. Serial No. 459,815.

*To all whom it may concern:*

Be it known that I, EMIL A. WEIBEL, a citizen of the United States, residing at Fairbank, in the county of Buchanan and State of Iowa, have invented new and useful Improvements in Handles, of which the following is a specification.

This invention relates to a handle and more particularly to a detachable handle that may be quickly connected to an article or receptacle and which is capable of being adjusted so as to be connected to various sized receptacles.

An object of the invention is the provision of a novel connection between the handle and the receptacle which is of simple durable construction.

A feature of the invention is to form the ends as illustrated so that they may be adjusted towards and away from each other and to limit such action so that the ends will not become permanently distorted.

With these and other objects in view the invention will be better understood from the following detailed description taken in connection with the accompanying drawing wherein:

Fig. 1 is a side elevation of a coffee pot showing my handle applied.

Fig. 2 is a longitudinal sectional view.

Fig. 3 is a diagrammatic view showing how the ends are yieldably moved towards each other.

Fig. 4 is a detail view.

Fig. 5 is a view of a modification.

Again referring to the drawing illustrating one construction of my invention numeral 1 designates any suitable receptacle such as a coffee pot provided with holes 2. The numeral 3 designates my improved handle constructed in this particular instance of a single length of wire bent to form convolutions 4 that decrease in diameter in opposite direction until the terminal convolutions 5 and 6 are reached. The ends 5 of the wire are given into L shape formation and a short limb 7 is arranged within certain of the convolutions, and has a loop connection 8 with the terminal convolutions. The long limb 9 extends between two convolutions so as to be readily passed through the opening 2.

From this construction it will be seen that the limbs 9 may be yieldably moved towards and away from each other to compensate for different distances between the holes 2 and this action is also facilitated by the yieldable construction of the body portion 10 formed by the convolution.

It will also be noted that the connection between the ends and the terminal convolutions are such as to limit the bending action of the ends so as not to become permanently distorted. Each end is provided with a clamping nut 11 having a screw threaded engagement 12 with the ends and arranged between these nuts is a yieldable washer 14 so that an absolute liquid tight joint is accomplished.

In the modification shown in Figure 5 the end 15 has a bowed portion 16 connected to the body portion 17 which gives the proper resiliency to the end without necessitating the end being passed through certain of the convolutions. At this point I wish to call attention to the fact that the ends may be bent in various other shapes than illustrated, as the main purpose to obtain is the resiliency for moving the ends toward and away from each other for the purpose heretofore stated.

It is, of course, to be understood that the handle may be constructed of other material than illustrated and may be constructed of one or more pieces, and, therefore, I do not desire to be limited in any manner except as set forth in the claim hereunto appended.

Having thus described my invention what I claim is:

A detachable handle constructed from wire bent to form convolutions, and L shaped ends a portion of which is arranged within certain of said convolution, and nuts for clamping the ends to an article.

In testimony whereof I affix my signature.

EMIL A. WEIBEL.